United States Patent [19]
Morton

[11] 3,862,353
[45] Jan. 21, 1975

[54] HIGH TEMPERATURE ASBESTOS INSULATED ELECTRICAL CONDUCTOR, AND METHOD OF MAKING SAME

[75] Inventor: Charles Gotwalt Morton, Chelmsford, Mass.

[73] Assignee: General Electric Company, New York, N.Y.

[22] Filed: Dec. 21, 1973

[21] Appl. No.: 427,356

[52] U.S. Cl.... 174/121 SR, 174/121 R, 174/121 A, 156/53
[51] Int. Cl. ............................................ H01b 7/02
[58] Field of Search...... 174/121 R, 121 A, 121 SR, 174/122 C, 124 C; 156/53

[56] References Cited
OTHER PUBLICATIONS
"Tagt High Temp. Lead Wire", Brochure, Radix Wire Co., Cleveland, Ohio, 2/72.

*Primary Examiner*—E. A. Goldberg
*Attorney, Agent, or Firm*—Raymond G. Simkins; P. L. Schlamp; S. A. Young

[57] ABSTRACT

A heat resistant, asbestos insulated electrical wire comprising a metallic conductor, a body of asbestos fiber surrounding the conductor, an enclosing braid of refractory and thermoplastic filaments, and a covering of thermoplastic film; and the method of making same. The thermoplastic filaments of the braid are fused to the underlying body of asbestos, and the covering of thermoplastic film is fused to the surface of the underlying braid.

10 Claims, 1 Drawing Figure

PATENTED JAN 21 1975

3,862,353

HIGH TEMPERATURE ASBESTOS INSULATED ELECTRICAL CONDUCTOR, AND METHOD OF MAKING SAME

BACKGROUND OF THE INVENTION

Asbestos, glass and other high temperature resistant fibers of inorganic compositions are commonly utilized in wire and cable constructions as a protection against exposure to high temperatures or possible fire. Wire or cable constructions containing such highly heat resistant inorganic fibers in their insulation or covering constructions are typically used in appliances and other devices containing heating elements, such as cooking stoves and ovens, dish washers and clothes dryers, or any service requiring a high degree of resistance to heat or possible flame conditions. Uses of inorganic fibers in a variety of wire and cable constructions are shown in the patent literature, for example U.S. Pat. Nos. 240,772; 2,038,377; 2,127,122; 2,182,669; 2,185,558; 2,226,590; 2,231,606; 2,234,560; 2,335,097; and 2,382,423.

It is, however, generally difficult to effectively unite or join together bodies or masses of inorganic fibers because of their characteristic lack of suppleness and cohesion. Moreover, due to the harsh and brittle nature of typical inorganic fibers, the handling of such fibers or of products containing the same can be physically distressing and an irritant to personnel.

SUMMARY OF THE INVENTION

This invention comprises a novel construction, and combination of components for an inorganic fiber insulated, high temperature resisting wire or cable wherein the fibrous components are united or joined together and the surface of the product has a smooth and sleek finish free of rough or harsh fiber ends or projections, and a method of making such products.

The fiber insulated electrical conductors of the invention include a conductor surrounded with an insulating body of asbestos fibers, which is enclosed within a braid or other fabric unit woven from a composite of inorganic and thermoplastic filaments, and an overlying covering film or finish of thermoplastic material. The foregoing assemblage is heat treated so as to fuse the thermoplastic components of the braid or fabric and adhere it to the underlying asbestos insulation, and also fuse the overlying thermoplastic film over the surface of the enclosing braid or fabric containing inorganic fiber.

OBJECTS OF THE INVENTION

It is a primary object of this invention to provide a novel and improved high temperature resistant, insulated electrical conductor having a composite of inorganic fibrous materials or phase which are effectively joined and united together, and a method of producing same.

It is also a primary object of this invention to provide a novel and improved high temperature resistant, insulated electrical conductor having a jacketing comprising harsh and brittle inorganic fibers and which is not physically distressing or irritating to handle and has a smooth and sleek finish free of rough or harsh fiber ends or projections, and a method of producing same.

It is a further object of this invention to provide a high temperature resistant electrical conductor insulated with a surrounding body of asbestos fiber which is effectively joined to and united with an enclosing braided or woven jacket comprising harsh inorganic fiber and which has a smooth and sleek finish which is not disagreeable to handle or a source of irritation.

BRIEF DESCRIPTION OF THE DRAWING

The drawing comprises a perspective view illustrating an insulated conductor product constructed and made according to this invention.

DETAILED DESCRIPTION OF A PREFERRED EMBODIMENT

Figure 1:
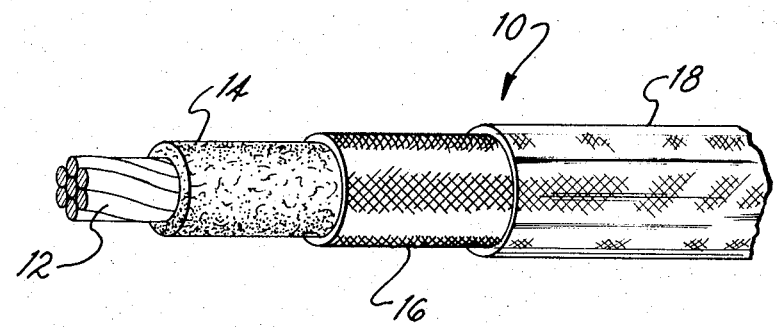

Referring to the drawing, the high temperature resistant, insulated electrical wire 10 of this invention and illustrated, includes a metallic conductor 12, a mass of asbestos fiber forming a body 14 surrounding the conductor, a braid 16 enclosing or jacketing the body of asbestos surrounding the conductor, and a covering 18 of thermoplastic film overlying the enclosing braid.

The metallic electrical conductor 12 may comprise a plurality of individual metal or wire-like strands twisted about themselves, such as illustrated, or a single strand. The body of asbestos fiber 14 surrounding the conductor is preferably a carded mat formed about the conductor. Nevertheless other "textile" forms of staple asbestos fiber, such as yarn or roving, carded slivers, felted or combed mats, or fabrics woven or braided therefrom, can be wrapped or folded around the conductor or otherwise applied and used as the primary electrical and thermal insulation, or a component thereof. However, since asbestos is primarily utilized in electrical insulations for its resistance to high temperature and protection afforded against exposure to high temperature or flame condition, the body of asbestos can be combined with other materials of more effective electrical insulating properties such as highly dielectric organic polymers. For example, a coating or layer of a suitable polymeric material or elastomer, such as polyethylene terephalate, polytetrafluoroethylene, or silicone rubber, can be applied to the metallic conductor or positioned between the conductor and the surrounding body of asbestos. Also other conventional or commonly used components can be included intermediate the conductor and the surrounding body of asbestos such as a paper separator.

The body of asbestos fiber 14 surrounding the conductor 12 is enclosed within a woven or interlaced composite fabric jacket such as a braid 16 which is formed or fabricated of composite strands comprising a combination of inorganic fiber and organic thermoplastic polymeric fiber. Preferably the strands of the weave or braid comprise several discrete parallel threads such as, for example, two to five threads with the number of threads and proportion of inorganic to organic thermoplastic generally depending on the diameter of the asbestos body over which the enclosure or jacket is applied. Apt proportions of the fiber content for each strand for most constructions and services comprise about 50 to about 75 percent by volume of inorganic fiber with the balance of about 25 percent to about 50 percent by volume of organic thermoplastic polymer.

The preferred inorganic fiber component for this unit of the invention comprises glass fiber or filaments, however other inorganic refractory type fibers can be substituted either in whole or part including, for example, refractory fibers of silica or aluminum and silica, fiberized metallurgical slags, and other so-called mineral fibers. The organic thermoplastic polymer fibers comprises polyester or nylon-type polyamide resin filaments, or combination thereof. The thermoplastic fibers or filaments of the braid are subsequently heat fused to adhere the braid with the underlying body of asbestos surrounding the conductor, and thereby unite or bond the enclosing braid or fabric 16 to the body of asbestos 14 surrounding the conductor 12.

The covering 18 overlying the braid 16 comprises a fused film of organic thermoplastic polymer material comprising polyester or nylon-type polyamide. The covering 18 can be applied by wrapping or winding strips or tapes of the thermoplastic resin film about the braid enclosed assemblage and heat fusing and adhering the film to the surface of the underlying braid 16 and thereby forming a substantially continuous, smooth and sleek finish extending over the harsh and brittle inorganic fibrous components thereof. In the drawing, the covering 18 is illustrated as being transparent because typical polyester resin produce transparent films. However, pigmented or opaque thermoplastic polymers can be used.

The method of this invention includes applying a mass of asbestos fiber around the conductor 12 to form a surrounding body of asbestos 14, and then enclosing the body of asbestos surrounding the conductor by weaving or interlacing a braid 16 or fabricating a woven jacket from a plurality of composite strands including both inorganic fibers such as glass filaments and organic thermoplastic fibers such as polyester filaments. Thereafter, the method comprises covering the braid 16 with a tape of thermoplastic film, and heating the assemblage to the fusing level of the thermoplastic ingredients and thereby fusing in situ the thermoplastic fiber component of the enclosing braid to the underlying body of asbestos and the thermoplastic film covering the braid to form a smooth and sleek finish thereon. This fusing of the thermoplastic components adheres the braid to the asbestos with at least a portion of the thermoplastic fibers of the braid providing the bond, and also unites the turns of the thermoplastic tape together and with the surface of the braid to form the overlying finish.

The following comprises an example illustrating the method of forming a high temperature resistant, asbestos insulated electrical wire product of this invention. A 30 mil thick body of asbestos fiber was carded onto a number 20 AWG multiple strand wire conductor. An enclosing braid of 28 picks was then interlaced over the asbestos body from 16 separate composite strands, each comprising two continuous filaments of glass and one continuous filament of polyester. A polyester tape 0.0005 inch thick and ⅜ inch wide was then helically wrapped, with a small overlap, around the braid to complete the assemblage. The assembled product was then passed through a 10 foot high heating tower maintained at a temperature of approximately 600°F, moving at a rate of about 10 feet per minute to heat fuse the polyester filaments of the braid to the underlying body of asbestos and adheringly join the braid thereto, and also to fuse the convolutions of the helically wound polyester tape together into a substantially continuous film adheringly covering the braid with a smooth and sleek finish.

What I claim as new and desire to secure by Letters Patent of the United States is:

1. A high temperature resistant, insulated electrical conductor, comprising:
   a. an electrical conductor;
   b. a body of asbestos fiber surrounding the electrical conductor;
   c. an enclosing fabric comprising refractory fibers embracing the body of asbestos fiber and being adhered to said body of asbestos fiber with a fused thermoplastic of at least one polymeric material selected from the group consisting of polyester and polyamide; and
   d. a covering of a fused in situ thermoplastic film of at least one polymeric material selected from the group consisting of polyester and polyamide.

2. The high temperature resistant, insulated electrical conductor of claim 1, wherein the enclosing fabric comprises a braid.

3. The high temperature resistant, insulated electrical conductor of claim 1, wherein the refractory fiber comprises glass.

4. The high temperature resistant, insulated electrical conductor of claim 1, wherein the thermoplastic polymeric material is polyester.

5. The high temperature resistant, insulated electrical conductor of claim 1, wherein the fabric is composed of a combination of glass fiber and polyester.

6. A high temperature resistant, insulated electrical conductor, comprising:
   a. an electrical conductor;
   b. a body of asbestos fiber surrounding the electrical conductor;
   c. an enclosing braid comprising refractory fiber embracing the body of asbestos fiber and being adhered to said body of asbestos fiber with fused polyester; and
   d. a covering of a fused in situ film of polyester.

7. The high temperature resistant, insulated electrical conductor of claim 6, wherein the braid is composed of a combination of glass fiber and polyester.

8. A high temperature resistant, insulated electrical conductor, comprising:
   a. a metallic electrical conductor;
   b. a body of felted asbestos fiber surrounding the electrical conductor;
   c. an enclosing braid comprising a combination of glass filaments and thermoplastic polyester embracing the body of felted asbestos fiber and being adhered to said felted body of asbestos fiber with in situ fused thermoplastic polyester; and
   d. a covering of an in situ fused film of polyester.

9. A method of making a high temperature resistant, insulated electrical conductor, comprising:
   a. applying a mass of asbestos fiber around an electrical conductor to form a surrounding body thereof;
   b. interlacing strands of refractory fiber and thermoplastic fiber of at least one polymeric material selected from the group consisting of polyester and polyamide about the body of asbestos fiber surrounding the electrical conductor to form an enclosing interlaced jacket;
   c. covering the interlaced jacket enclosed body of asbestos fiber surrounding the electrical conductor with thermoplastic film of at least one polymeric material selected from the group consisting of polyester and polyamide; and d. fusing the thermoplastic fiber of the interlaced jacket to the underlying body of asbestos fiber and the covering of thermoplastic film by heating.

10. A method of making a high temperature resistant, insulated electrical conductor, comprising:
   a. applying a mass of felted asbestos fiber around an electrical conductor to form a surrounding body thereof;
   b. braiding strands of glass filaments and polyester filaments about the body of asbestos fiber surrounding the electrical conductor to form an enclosing braid;
   c. covering the braid enclosed body of asbestos fiber surrounding the electrical conductor, by winding thereabout tape of polyester film; and
   d. fusing the thermoplastic polyester filaments of the braid to the underlying body of asbestos and the covering of wound tape of thermoplastic polyester film by heating.

* * * * *